United States Patent
Alexander et al.

(10) Patent No.: US 9,946,588 B2
(45) Date of Patent: *Apr. 17, 2018

(54) STRUCTURE FOR REDUCING POWER CONSUMPTION FOR MEMORY DEVICE

(71) Applicant: International Business Machines Corporation, Armonk, NY (US)

(72) Inventors: Gregory W. Alexander, Pflugerville, TX (US); Khary J. Alexander, Poughkeepsie, NY (US); Ilya Granovsky, Kiryat Tivon (IL); Christian Jacobi, Poughkeepsie, NY (US); Gregory Miaskovsky, Ramat Hahayal (IL); James R. Mitchell, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 18 days.

This patent is subject to a terminal disclaimer.

(21) Appl. No.: 14/573,388

(22) Filed: Dec. 17, 2014

(65) Prior Publication Data
US 2016/0179160 A1    Jun. 23, 2016

(51) Int. Cl.
*G06F 11/07* (2006.01)
*G06F 11/16* (2006.01)
(Continued)

(52) U.S. Cl.
CPC .......... *G06F 11/073* (2013.01); *G06F 1/3275* (2013.01); *G06F 9/30* (2013.01);
(Continued)

(58) Field of Classification Search
None
See application file for complete search history.

(56) References Cited

U.S. PATENT DOCUMENTS 5,721,863 A * 2/1998 Covino ............... G06F 12/1054
                                                   711/128
5,832,297 A * 11/1998 Ramagopal ......... G06F 9/30047
                                                   710/5

(Continued)

OTHER PUBLICATIONS

Cavanagh, Joseph. X86 Assembly Language and C Fundamentals. CRC Press, 2013. p. 92-94.*

(Continued)

*Primary Examiner* — Edward Dudek, Jr.
*Assistant Examiner* — Ralph A Verderamo, III

(57) ABSTRACT

Techniques for generating a design structure for cache power reduction are described herein. In one example, a system includes logic to detect memory address information corresponding to accessed data in a first instruction, and detect memory address information corresponding to accessed data in a second instruction. The logic can also compare the memory address information corresponding to the first instruction and the memory address information corresponding to the second instruction, and detect, based on the comparison, that the accessed data in the first instruction and the accessed data in the second instruction are in a same data range of the memory device. The logic can also execute the second instruction using the accessed data from the first instruction.

11 Claims, 5 Drawing Sheets

| | A-2 | A-1 | A0 | A1 | A2 | A3 | A4 |
|---|---|---|---|---|---|---|---|
| First Instruction | Issue Instruction | Logical Address Calculation | Memory Access | Retrieve Data | Retrieve Data | Complete Address Calculation | |
| Second Instruction | Issue Instruction | Same Base and Index Calculation | Same Data Range Detection | Use Accessed Data From First Instruction | Use Accessed Data From First Instruction | Complete Address Calculation | Set Error in Case of Address Mismatch |

300

(51) Int. Cl.
*G06F 11/30* (2006.01)
*G06F 1/32* (2006.01)
*G06F 9/30* (2006.01)

(52) U.S. Cl.
CPC ...... *G06F 11/1666* (2013.01); *G06F 11/3037* (2013.01); *Y02B 60/1225* (2013.01); *Y02B 60/1228* (2013.01)

(56) References Cited

U.S. PATENT DOCUMENTS

| | | | | |
|---|---|---|---|---|
| 6,360,314 | B1* | 3/2002 | Webb, Jr. | G06F 9/3826 712/206 |
| 6,393,536 | B1* | 5/2002 | Hughes | G06F 9/3838 711/118 |
| 6,449,694 | B1* | 9/2002 | Burgess, Jr. | G06F 12/0864 711/118 |
| 6,581,140 | B1* | 6/2003 | Sullivan | G06F 12/0864 711/128 |
| 6,757,817 | B1* | 6/2004 | Booth | G06F 9/381 711/125 |
| 6,938,126 | B2 | 8/2005 | Remirez et al. | |
| 7,171,543 | B1* | 1/2007 | Ronen | G06F 9/3017 711/212 |
| 7,177,981 | B2 | 2/2007 | Davis | |
| 7,472,370 | B1 | 12/2008 | Reynolds et al. | |
| 7,529,889 | B2 | 5/2009 | Vasekin et al. | |
| 8,271,732 | B2 | 9/2012 | Cohen et al. | |
| 8,285,936 | B2 | 10/2012 | Roberts et al. | |
| 8,570,827 | B2 | 10/2013 | Sullivan et al. | |
| 2002/0194430 | A1* | 12/2002 | Cho | G06F 9/3802 711/118 |
| 2003/0018875 | A1* | 1/2003 | Henry | G06F 9/3834 711/203 |
| 2003/0093641 | A1* | 5/2003 | Kahn | G06F 9/30101 711/170 |
| 2003/0204673 | A1* | 10/2003 | Venkumahanti | G06F 9/383 711/137 |
| 2005/0044317 | A1* | 2/2005 | Rivers | G06F 12/0897 711/118 |
| 2006/0236036 | A1* | 10/2006 | Gschwind | G06F 12/0862 711/137 |
| 2006/0271767 | A1* | 11/2006 | Osanai | G06F 9/30043 712/216 |
| 2007/0028051 | A1* | 2/2007 | Williamson | G06F 12/0864 711/128 |
| 2009/0210675 | A1* | 8/2009 | Alexander | G06F 9/3016 712/216 |
| 2012/0047329 | A1* | 2/2012 | Goel | G06F 12/0882 711/125 |
| 2012/0290780 | A1* | 11/2012 | Kinter | G06F 12/0864 711/104 |
| 2013/0111147 | A1* | 5/2013 | Mogul | G06F 12/0802 711/137 |
| 2013/0179640 | A1 | 7/2013 | Aggarwal et al. | |
| 2013/0268715 | A1* | 10/2013 | Fetterman | G06F 9/3887 711/5 |
| 2014/0082390 | A1 | 3/2014 | Bunce et al. | |
| 2014/0281116 | A1* | 9/2014 | Abdallah | G06F 12/1054 711/3 |
| 2014/0365742 | A1* | 12/2014 | Patel | G06F 12/145 711/163 |

OTHER PUBLICATIONS

P. Carazo et al., "L1 Data Cache Power Reduction Using a Forwarding Predictor," Integrated Circuit and System Design, Power and Timing Modeling, Optimization, and Simulation Lecture Notes in Computer Science, vol. 6448, pp. 116-125, 2011.

* cited by examiner

200

| | A-2 | A-1 | A0 | A1 | A2 | A3 | A4 |
|---|---|---|---|---|---|---|---|
| First Instruction | Issue Instruction | Logical Address Calculation | Memory Access | Retrieve Data | Retrieve Data | Complete Address Calculation | |
| Second Instruction | | Issue Instruction | Same Data Range Detection | Same Base and Index Calculation | Use Accessed Data From First Instruction | Use Accessed Data From First Instruction | Complete Address Calculation | Set Error in Case of Address Mismatch |

STRUCTURE FOR REDUCING POWER CONSUMPTION FOR MEMORY DEVICE

BACKGROUND

The present invention relates to a design structure, and more specifically, but not exclusively, to a design structure for reducing power consumption for a memory device.

SUMMARY

According to an embodiment described herein, a design structure is tangibly embodied in a machine readable medium for designing, manufacturing, or testing an integrated circuit, wherein the machine readable medium is not a transitory signal per se. The design structure comprises program instructions executable by a processor to cause the processor to detect memory address information corresponding to accessed data in a first instruction and detect memory address information corresponding to accessed data in a second instruction. Additionally, the design structure comprises program instructions executable by a processor to cause the processor to compare the memory address information corresponding to the first instruction and the memory address information corresponding to the second instruction, detect, based on the comparison, that the accessed data in the first instruction and the accessed data in the second instruction are in a same data range of the memory device, and execute the second instruction using the accessed data from the first instruction.

According to another embodiment described herein, a system for generating a design structure can include logic to detect memory address information corresponding to accessed data in a first instruction. The logic can also detect memory address information corresponding to accessed data in a second instruction and compare the memory address information corresponding to the first instruction and the memory address information corresponding to the second instruction. Additionally, the logic can detect, based on the comparison, that the accessed data in the first instruction and the accessed data in the second instruction are in a same data range of the memory device and execute the second instruction using the accessed data from the first instruction.

According to another embodiment described herein, a method in a computer-aided design system for generating a functional design model of a processor can include detecting memory address information corresponding to accessed data in a first instruction and detecting memory address information corresponding to accessed data in a second instruction. The method can also include comparing the memory address information corresponding to the first instruction and the memory address information corresponding to the second instruction, detecting, based on the comparison, that the accessed data in the first instruction and the accessed data in the second instruction are in a same data range of the memory device, and executing the second instruction using the accessed data from the first instruction. The method can also include detecting an error from the execution of the second instruction.

BRIEF DESCRIPTION OF THE SEVERAL VIEWS OF THE DRAWINGS

FIG. 3 is an example timing diagram of an embodiment for a design structure for reducing power consumption for a memory device;

DETAILED DESCRIPTION

As integrated circuit devices execute a larger number of instructions within a shorter period of time, the power consumption of the integrated circuit devices increases. For some integrated circuits, a substantial portion of the power consumption corresponds to requesting data to be used when executing instructions. In some examples, the data requested by integrated circuits may be stored in a memory device, such as a cache device, that provides copies of data to an integrated circuit from a larger, slower non-volatile memory device such as a hard disk, among others.

According to embodiments of the present disclosure, a computing device can generate a design structure to reduce power consumption of a memory device. In some embodiments, the design structure can reduce power consumption of a memory device, which may physically reside on an integrated circuit, by reducing the number of data requests performed while executing instructions. A data request, as referred to herein, can include any suitable read operation transmitted to a memory device from logic or a processing circuit. In some embodiments, a read operation may be performed by a processor or integrated circuit while executing an instruction to enable the processor or integrated circuit to execute a mathematical calculation, a logical calculation, or a data transfer, among others. In some embodiments, the design structure generated by the computing device can compare memory addresses associated with requested data from a first instruction and requested data from a second instruction. In some examples, if the memory addresses from the first instruction and the second instruction are the same, the design structure can execute the second instruction using data retrieved from the memory address for the first instruction. In some embodiments, the design structure can also reduce latency caused by the comparison by comparing the memory addresses using a fast compare technique or a slow compare technique in which different portions of the memory addresses are compared.

Figure 1:
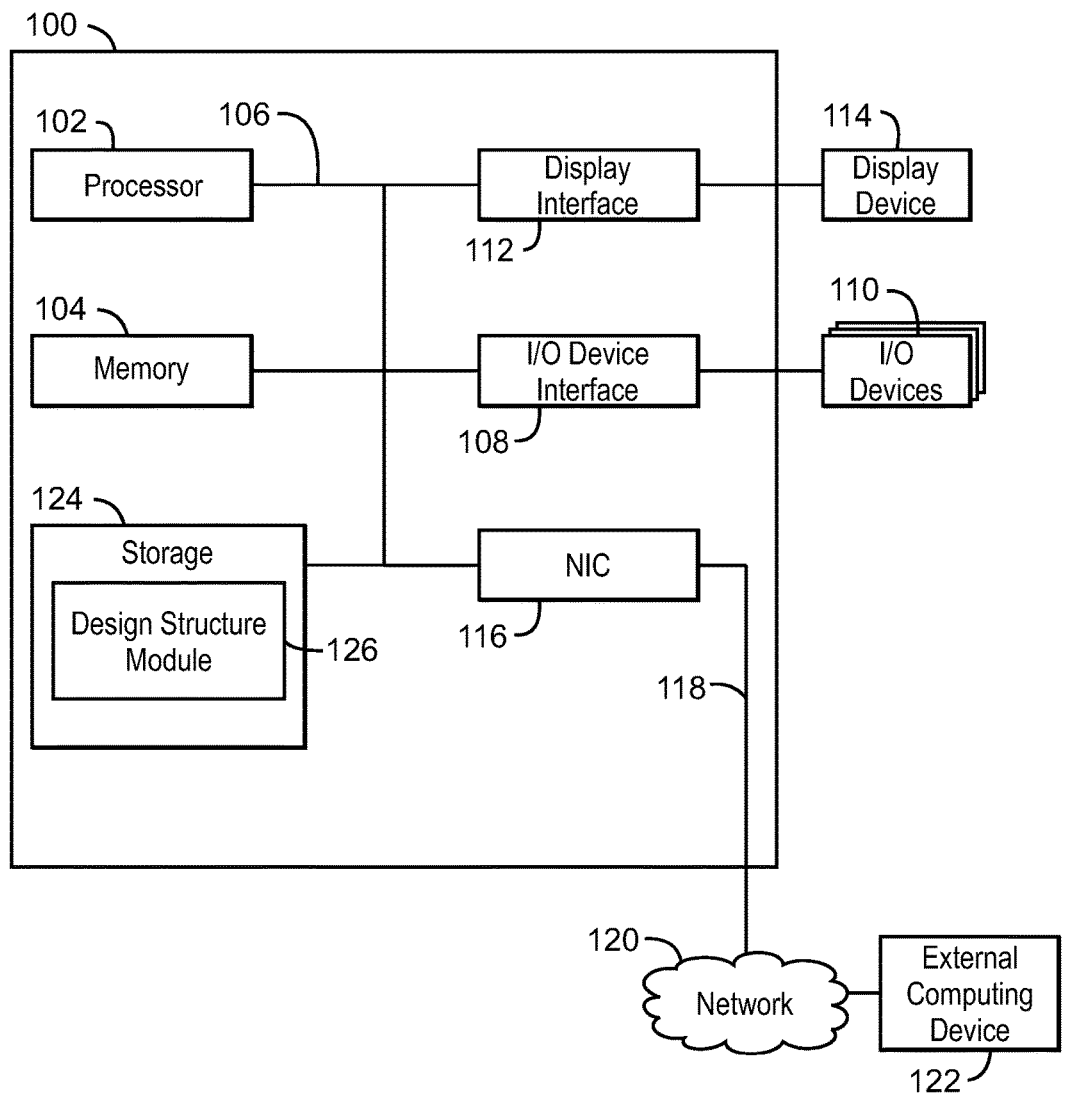
FIG. 1 depicts a block diagram of a computing device that can generate a design structure for reducing power consumption for a memory device according to embodiments described herein.

FIG. 1 is an example of a computing device that can generate a design structure for reducing power consumption of a memory device. The computing device 100 may be for example, a desktop computer, laptop computer, tablet computer, or smartphone. The computing device 100 may include a processor 102 that is adapted to execute stored instructions, a memory device 104 that can store said instructions. The processor can be a single-core processor, multi-core processor, computing cluster, or any number of other configurations. The memory 104 can include random access memory (RAM), read only memory, flash memory, or any other suitable memory systems. The instructions executed by the processor 102 may be used to implement a method that can generate a design structure for reducing power consumption of a memory device.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 can transmit data using any suitable interface or protocol, such as the internet small computer system interface, among others. The NIC 116 may transmit data through any suitable number of data lanes 118 to a network 120. A data lane, as referred to herein, can include any suitable link that can transmit data. In some examples, the system interconnect 106 can also include any suitable number of data lanes that transmit data. The network 120 may be a cellular network, a radio network, a wide area network (WAN), a local area network (LAN), or the Internet, among others. An external computing device 122 may connect to the computing device 100 through the network 120.

The processor 102 may also be linked through the system interconnect 106 to a storage device 124 that can include a hard drive, an optical drive, a USB flash drive, an array of drives, or any combinations thereof. In some examples, the storage device 124 can include a design structure module 126 that can generate a design structure to reduce power consumption of a memory device, such as a cache device, among others. In some embodiments, the design structure module 126 can detect a first instruction and a second instruction to be executed. The design structure module 126 can detect a first memory address corresponding to data to be retrieved by the first instruction and detect a second memory address corresponding to data to be retrieved by the second instruction. In some embodiments, the design structure module 126 can compare the first memory address and the second memory address using a fast compare technique. The fast compare technique, as referred to herein, includes comparing a portion of the first memory address and the second memory address. For example, each memory address may include base data to be stored in a base register, index data to be stored in an index register, and a displacement value. In some embodiments, the fast compare technique can compare the base data of the first memory address and the second address or the base data and the index data of the first memory address and the second memory address. The fast memory technique may not compute or determine the complete memory address for the first instruction or the second instruction, which can reduce the latency associated with the comparison.

In some embodiments, the design structure module 126 can also perform a slow compare technique to detect if the fast compare technique resulted in an error. For example, the fast compare technique may generate a result indicating that the memory address of the first instruction and the memory address of the second instruction are the same. However, the slow compare technique may detect an error by generating the complete memory addresses for the first memory address and the second memory address. In some examples, the displacement values may differ between the first memory address and the second memory address. Accordingly, the memory addresses of the first instruction and the second instruction may correspond to data stored in different portions of a memory or cache device. Therefore, accessing the data associated with the memory addresses of the first instruction and the second instruction may include generating two separate read operations that retrieve data from the memory or cache device. In some embodiments, the slow compare technique of the design structure module 126 can generate an error in response to detecting that the fast compare technique erroneously indicated that the memory address of the first instruction and the second instruction correspond to the same data. In some examples, in response to detecting an error with the fast compare technique, the design structure module 126 can also generate a second read operation to retrieve the data corresponding to the memory address of the second instruction.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the design structure module 126 may be partially, or entirely, implemented in hardware and/or in the processor 102. For example, the functionality may be implemented with an application specific integrated circuit, in logic implemented in the processor 102, logic implemented in the NIC 116, I/O device interface 108, or logic implemented in a memory controller, among others.

Figure 2:
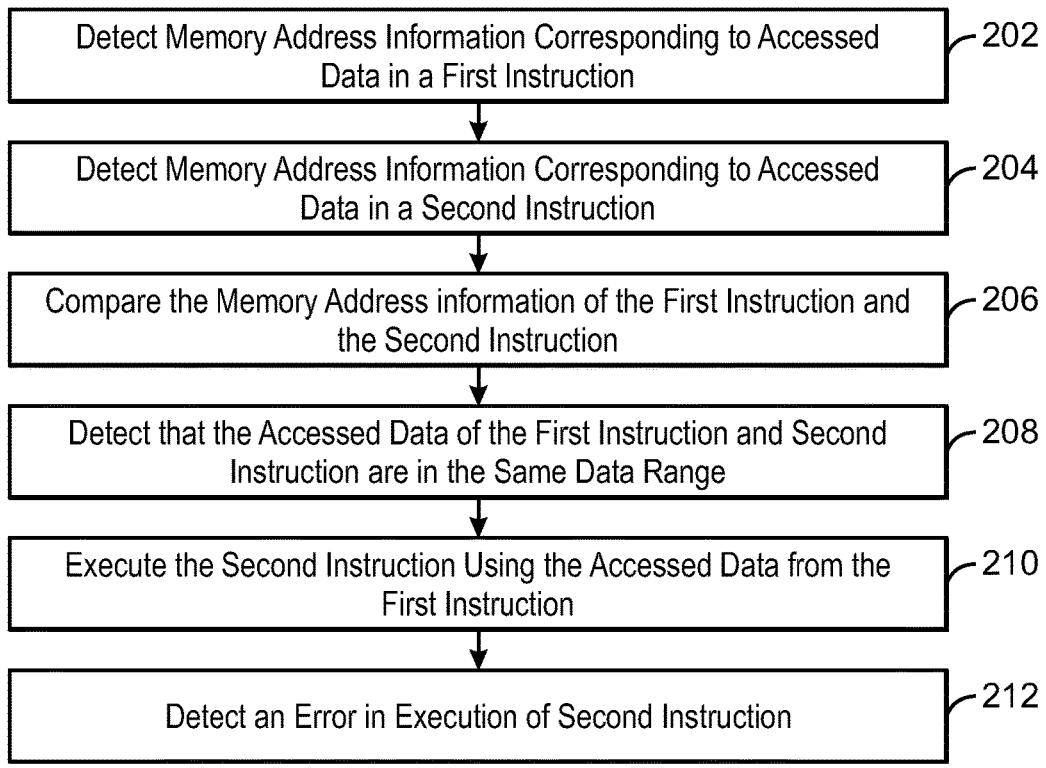
FIG. 2 is a process flow diagram of an example method that can generate a design structure for reducing power consumption for a memory device according to embodiments described herein.

FIG. 2 is an example of a method that can generate a design structure for reducing power consumption of a memory device. The method 200 can be implemented with any suitable computing device, such as the computing system 100 of FIG. 1.

At block 202, the design structure module 126 can detect memory address information corresponding to accessed data in a first instruction. The memory address information, as referred to herein, can include base data, index data, and a displacement value. In some examples, the base data can be stored in the most significant bits, the index value can be stored in less significant bits, and the displacement value can be stored in the least significant bits. For example, the base data may be stored in the bits of a memory address that have the largest value, the index data may be stored in the bits that have a smaller value than the base data, and the displacement value may be stored in the bits that have a smaller value than the index data. In some embodiments, the base data, index data, and displacement value can be stored in any suitable arrangement within the memory address. The accessed data, as referred to herein, can include the data physically stored in a memory device at the memory address indicated by the memory address information. In some examples, the accessed data can be used to execute the first instruction. For example, the accessed data may include data to be used for a mathematical operation, a logical operation, or any other suitable operation or instruction.

At block 204, the design structure module 126 can detect memory address information corresponding to accessed data in a second instruction. The memory address information corresponding to accessed data in the second instruction can also include base data, index data, and a displacement value. In some examples, the memory address information of the second instruction can store the base data, the index data, and the displacement value using the same techniques as the memory address for the first instruction. For example, the base data, index data, and displacement value of the memory address information of the second instruction can be stored in any suitable arrangement such as storing the base data in the most significant bits, the index data in bits less significant than the base data bits, and the displacement value in bits less significant than the index data bits.

At block 206, the design structure module 126 can compare the memory address information corresponding to the first instruction and the memory address information corresponding to the second instruction. As discussed above, the design structure module 126 may first compare the memory address information using a fast compare technique in which a portion of the memory address information is compared. For example, the fast compare technique may compare base data and/or index data for memory addresses. In some embodiments, the base data and/or index data for two or more memory addresses may correspond to data stored in the same memory gate or transistor in a memory device. In some examples, the displacement value for a memory address may indicate the bits to retrieve from within a memory gate or transistor in a memory device. In some embodiments, the fast compare technique may compare the base data and/or index data to indicate that the first memory address and the second memory address correspond to the same memory gate or transistor in a memory device.

In some examples, the data requested from a memory device may be stored in an output register of the memory device. If the fast compare technique indicates that two memory addresses correspond to data stored in the same portion of a memory device, such as the same transistor, the design structure module 126 can request data for a second instruction from the output register without providing a power signal to memory gates or transistors that store data within the memory device.

At block 208, the design structure module 126 can detect, based on the comparison, that the accessed data in the first instruction and the accessed data in the second instruction are in a same data range of the memory device. In some embodiments, the detection can be based on whether the accessed data from the first instruction and second instruction correspond to data stored within a predetermined range in a memory device. For example, the predetermined threshold may indicate that the accessed data from the first instruction and the second instruction are to be within a range, such as one octoword, among others, which can ensure that the accessed data from the first instruction and the second instruction both reside within an output register of the memory device. In some embodiments, the detection of the data range can be based on a difference between the displacement values of the first memory address and the second memory address. If the accessed data from the first instruction and the second instruction are not within the same data range, the design structure module 126 may execute two separate read operations to retrieve the accessed data for the first instruction and the second instruction.

At block 210, the design structure module 126 can execute the second instruction using the accessed data from the first instruction. In some embodiments, the design structure module 126 may execute a second instruction using data corresponding to the memory address of the first instruction by accessing data stored in an output register of a memory device. The design structure 126 may reduce the power consumption of the memory device by reducing the number of read operations executed in the memory device that access memory gates or transistors.

At block 212, the design structure module 126 can detect an error in the execution of the second instruction based on a slow compare technique. For example, the design structure module 126 may generate complete memory addresses based on memory address information for data requested by the first instruction and data requested by the second instruction. A complete memory address, as referred to herein, include translating the memory address information into a physical memory address for a memory device using any suitable technique. The slow compare technique may compare the complete memory addresses corresponding to the first instruction and the second instruction to verify the results of the fast compare technique, which previously indicated that the data to be accessed by a first instruction and second instruction are within the same data range. For example, the design structure module 126 can generate an error in response to detecting a difference between the base data of the first instruction and the second instruction, detecting a difference between the index data of the first instruction and the second instruction, or detecting that the displacement value of the first instruction and the displacement value of the second instruction are not within the same data range. The design structure module 126 can also generate an error in response to detecting that the first and second instruction are executed in different addressing mode. For example, the design structure module 126 may detect that the first instruction was executed in 64-bit addressing mode and the second instruction was executed in 32-bit addressing mode. In some embodiments, the design structure module 126 may generate an error indicating that the second instruction was executed using erroneous data.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 can include determining if the first instruction and the second instruction are consecutive. In some embodiments, the design structure module 126 may compare memory addresses from consecutive instructions using the fast compare technique and memory addresses from nonconsecutive instructions using the slow compare technique. Alternatively, in some embodiments, the design structure module 126 may compare memory addresses from nonconsecutive instructions and memory addresses from consecutive instructions using the fast compare technique described above.

In some embodiments, the design structure module 126 is to prevent power to the memory device during the execution of the second instruction.

FIG. 3 is an example illustration of a timing diagram for a design structure that can reduce the power consumption of a memory device. The timing diagram includes various stages of execution of instructions. For example, each instruction may include stages A-2, A-1, A0, A1, A2, A3, and A4.

At stage A-2, a design structure module 126 or a processor can issue instructions for the first instruction and the second instruction. Issuing an instruction, as referred to herein, can include fetching an instruction and operands. In some examples, issuing an instruction may also include decoding an instruction.

At stage A-1 of the first instruction, the design structure module 126 or a processor may calculate a memory address from a first instruction that is to be executed. Calculating a memory address from the first instruction can include translating base data, index data, and a displacement value for the memory address of the first instruction into a logical memory address in a memory device. The logical memory address may include a memory address based on a virtual memory system, among other memory management techniques. At stage A-1 of the second instruction, the design structure 126 or a processor may compare the base data and index data of the memory addresses for the first instruction and second instruction. At stage A-1, the design structure 126 or processor may also indicate that second instruction is using the same base data and index data values as in the first instruction.

At stage A0 of the first instruction, the design structure module 126 or a processor can access a memory device to retrieve data from the calculated memory address from stage A-1. In some examples, the design structure module 126 or a processor can send the memory address calculated at stage A-1 to a memory device.

At stage A0 of the second instruction, the design structure 126 or a processor may compare the memory address of the first instruction and the second instruction using the fast compare technique described above to determine if the memory addresses of the first instruction and the second instruction are in the same data range. In some examples, if the memory addresses of the first instruction and the second instruction are in the same data range, the design structure module 126 or a processor can execute the second instruction with data retrieved for the first instruction. If the memory addresses of the first instruction and the second instruction are not in the same data range, the design structure module 126 or a processor may request data from a memory device using the memory address corresponding to the second instruction.

At stages A1 and A2 of the first instruction, the design structure module 126 or a processor can retrieve data from the memory device. At stages A1 and A2 of the second instruction, the data for the second instruction can be retrieved without providing power to memory gates or transistors within a memory device. For example, the data stored in an output register of the memory device may be reused by the second instruction (at stages A1 and A2 of the second instruction) if the data from the first instruction and the second instruction were determined to be within the same data range at Stage A0. In some embodiments, the design structure module 126 also executes the first instruction and second instruction during stages A1 and A2.

At stage A3 of each instruction, the design structure module 126 or a processor can calculate a complete memory address for the each instruction. Calculating the complete memory address for an instruction, as discussed above, can include translating the memory address information into a physical memory address for a memory device using any suitable technique. For example, calculating the complete memory address may include translating or mapping a logical memory address to a physical memory address based on page tables in a virtual memory implementation.

At stage A4 of the second instruction, the design structure 126 or a processor can generate an error if the complete memory address for the second instruction differs from the results generated by the fast compare technique. The error can indicate that the result returned by the second instruction is inaccurate. In some embodiments, the design structure module 126 can rescind the second instruction in response to generating an error, which can prevent applications or hardware components from using the result from the second instruction to execute additional instructions.

Figure 4:
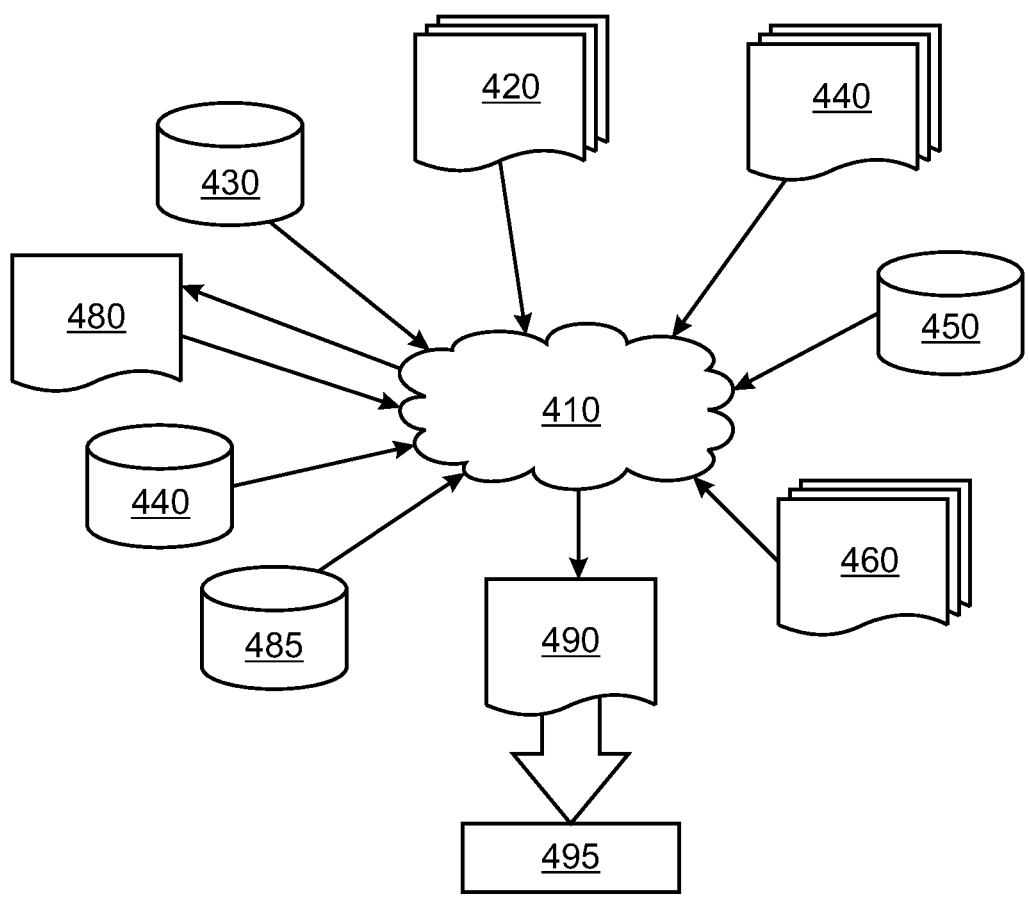
FIG. 4 is an illustration of multiple design structures that are processed by a design process.

FIG. 4 shows a block diagram of an exemplary design flow 400 used for example, in semiconductor IC logic design, simulation, test, layout, and manufacture. Design flow 400 includes processes, machines and/or mechanisms for processing design structures or devices to generate logically or otherwise functionally equivalent representations of the design structures and/or devices described above and shown in FIGS. 1-3, and 5. The design structures processed and/or generated by design flow 400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 400 may vary depending on the type of representation being designed. For example, a design flow 400 for building an application specific IC (ASIC) may differ from a design flow 400 for designing a standard component or from a design flow 400 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 420 that is preferably processed by a design process 410. Design structure 420 may be a logical simulation design structure generated and processed by design process 410 to produce a logically equivalent functional representation of a hardware device. Design structure 420 may also or alternatively comprise data and/or program instructions that when processed by design process 410, generate a functional representation of the physical structure of a hardware device. Whether representing functional and/or structural design features, design structure 420 may be generated using electronic computer-aided design (ECAD) such as implemented by a core developer/designer. When encoded on a machine-readable data transmission, gate array, or storage medium, design structure 420 may be accessed and processed by one or more hardware and/or software modules within design process 410 to simulate or otherwise functionally represent an electronic component, circuit, electronic or logic module, apparatus, device, or system such as those shown in FIGS. 1-3, and 5. As such, design structure 420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 410 preferably employs and incorporates hardware and/or software modules for synthesizing, translating, or otherwise processing a design/simulation functional equivalent of the components, circuits, devices, or logic structures shown in FIGS. 1-3, and 5 to generate a Netlist 480 which may contain design structures such as design structure 420. Netlist 480 may comprise, for example, compiled or otherwise processed data structures representing a list of wires, discrete components, logic gates, control circuits, I/O devices, models, etc. that describes the connections to other elements and circuits in an integrated circuit design. Netlist 480 may be synthesized using an iterative process in which netlist 480 is resynthesized one or more times depending on design specifications and parameters for the device. As with other design structure types described herein, netlist 480 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 410 may include hardware and software modules for processing a variety of input data structure types including Netlist 480. Such data structure types may reside, for example, within library elements 430 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 440, characterization data 450, verification data 460, design rules 470, and test data files 485 which may include input test patterns, output test results, and other testing information. Design process 410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 410 without deviating from the scope and spirit of the invention. Design process 410 may also include modules for performing standard circuit design processes such as timing analysis, verification, design rule checking, place and route operations, etc.

Design process 410 employs and incorporates logic and physical design tools such as HDL compilers and simulation model build tools to process design structure 420 together with some or all of the depicted supporting data structures along with any additional mechanical design or data (if applicable), to generate a second design structure 490. Design structure 490 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 420, design structure 490 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3, and 5. In one embodiment, design structure 490 may comprise a compiled, executable HDL simulation model that functionally simulates the devices shown in FIGS. 1-3, and 5.

Design structure 490 may also employ a data format used for the exchange of layout data of integrated circuits and/or symbolic data format (e.g. information stored in a GDSII (GDS2), GL1, OASIS, map files, or any other suitable format for storing such design data structures). Design structure 490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3, and 5. Design structure 490 may then proceed to a stage 495 where, for example, design structure 490: proceeds to tape-out, is released to manufacturing, is released to a mask house, is sent to another design house, is sent back to the customer, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
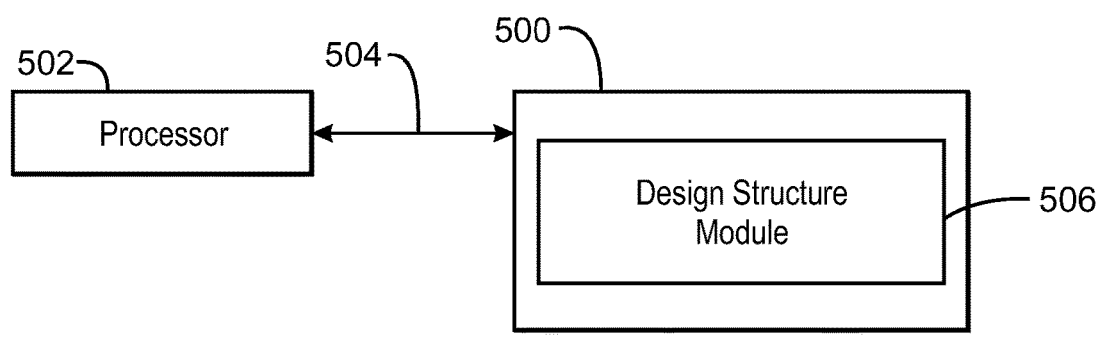
FIG. 5 is a tangible, non-transitory computer-readable medium that can generate a design structure for reducing power consumption of a memory device according to embodiments described herein.

Referring now to FIG. 5, a block diagram is depicted of an example of a tangible, non-transitory computer-readable medium that can generate a design structure for reducing power consumption of a memory device. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a design structure module 506 may generate a design structure for logic that can reduce the power consumption of a memory device such as L1, L2, or L3 cache. In some embodiments, the design structure module 506 can reduce the power consumption of a memory device by generating a design structure for a processor to compare the memory address of data to be retrieved by a first instruction to a memory address of data to be retrieved by a second instruction. If the memory address of the first instruction and the second instruction are within a predetermined data range, the data retrieved for execution of the first instruction can be used to execute the second instruction.

It is to be understood that any number of additional software components not shown in FIG. 5 may be included within the tangible, non-transitory, computer-readable medium 500, depending on the specific application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating a design structure comprising: logic to:
   detect memory address information corresponding to accessed data in a first instruction, the memory address information corresponding to the first instruction indicating a first set of base data, a first set of index data, and a first displacement value;
   detect memory address information corresponding to accessed data in a second instruction, the memory address information corresponding to the second instruction indicating a second set of base data, a second set of index data, and a second displacement value;

issue instructions for the first instruction and the second instruction, wherein the first instruction and the second instruction are to be fetched at a same first stage of execution, and wherein issuing instructions for the first instruction and the second instruction comprises fetching a first operand for the first instruction and a second operand for the second instruction;

compare, via a fast compare technique, the first set of index data corresponding to the first instruction and the second set of index data corresponding to the second instruction;

detect, based on the comparison, that the accessed data in the first instruction and the accessed data in the second instruction are in a same data range of a memory device;

execute the second instruction using the accessed data from the first instruction; and detect an error from the execution of the second instruction in response to using a slow compare technique to compare the first set of base data to the second set of base data, the first set of index data to the second set of index data, and the first displacement value to the second displacement value and in response to detecting an address mode of the first instruction differs from an address mode of the second instruction, wherein the address mode of the first instruction is a 32 bit address mode and the address mode of the second instruction is a 64 bit address mode.

2. The system of claim 1, wherein the logic is to prevent power to the memory device during the execution of the second instruction.

3. The system of claim 1, wherein the memory device is L1 cache.

4. The system of claim 1, wherein the logic is to generate the error in response to detecting a difference between the base data of the first instruction and the second instruction, detecting a difference between the index data of the first instruction and the second instruction, or detecting that the displacement value of the first instruction and the displacement value of the second instruction are not within the data range.

5. The system of claim 1, wherein the logic is to rescind the second instruction in response to detecting the error from the slow compare technique.

6. The system of claim 1, wherein the logic is to calculate, at a second stage of execution of the first instruction, a memory address for the first instruction and, at a second stage of execution of the second instruction, compare the first set of index data corresponding to the first instruction and the second set of index data corresponding to the second instruction, and compare the first set of base data of the first instruction with the second set of base data of the second instruction.

7. The system of claim 1, wherein the logic is to indicate that the second set of base data and the first set of base data are the same.

8. A design structure tangibly embodied in a non-transitory computer readable storage medium for designing, manufacturing, or testing an integrated circuit, the design structure comprising program instructions executable by a processor to cause the processor to:

detect memory address information corresponding to accessed data in a first instruction, the memory address information corresponding to the first instruction indicating a first set of base data, a first set of index data, and a first displacement value;

detect memory address information corresponding to accessed data in a second instruction, the memory address information corresponding to the second instruction indicating a second set of base data, a second set of index data, and a second displacement value;

issue instructions for the first instruction and the second instruction, wherein the first instruction and the second instruction are to be fetched at a same first stage of execution, and wherein issuing instructions for the first instruction and the second instruction comprises fetching a first operand for the first instruction and a second operand for the second instruction;

compare, via a fast compare technique, the first set of index data corresponding to the first instruction and the second set of index data corresponding to the second instruction;

detect, based on the comparison, that the accessed data in the first instruction and the accessed data in the second instruction are in a same data range of the memory device;

execute the second instruction using the accessed data from the first instruction; and detect an error from the execution of the second instruction in response to using a slow compare technique to compare the first set of base data to the second set of base data, the first set of index data to the second set of index data, and the first displacement value to the second displacement value and in response to detecting an address mode of the first instruction differs from an address mode of the second instruction, wherein the address mode of the first instruction is a 32 bit address mode and the address mode of the second instruction is a 64 bit address mode.

9. The design structure of claim 8, wherein the program instructions cause the processor to prevent power to the memory device during the execution of the second instruction.

10. The design structure of claim 8, wherein the memory device is L1 cache.

11. The design structure of claim 8, wherein the logic is to generate the error in response to detecting a difference between the base data of the first instruction and the second instruction, detecting a difference between the index data of the first instruction and the second instruction, or detecting that the displacement value of the first instruction and the displacement value of the second instruction are not within the data range.

* * * * *